(12) United States Patent
Moretti et al.

(10) Patent No.: US 6,179,471 B1
(45) Date of Patent: Jan. 30, 2001

(54) DEVICE FOR MOUNTING A SENSOR TO A RAILWAY AXLE BEARING UNIT

(75) Inventors: Roberto Moretti, Cambiano; Matteo Genero, Santena; Aniello De Ponte; Fabrizio Sozzi, both of Turin, all of (IT)

(73) Assignee: SKF Industrie S.p.A., Turin (IT)

( * ) Notice: Under 35 U.S.C. 154(b), the term of this patent shall be extended for 0 days.

(21) Appl. No.: 09/259,858

(22) Filed: Mar. 1, 1999

(30) Foreign Application Priority Data

Jul. 27, 1998 (IT) .............................................. TO98A0646

(51) Int. Cl.[7] .................................................... B61F 15/20
(52) U.S. Cl. ............................................................ 384/448
(58) Field of Search ................................... 384/448, 459, 384/571; 324/173, 174

(56) References Cited

U.S. PATENT DOCUMENTS

| 3,500,091 | 3/1970 | Jones . |
|---|---|---|
| 5,289,120 | 2/1994 | Moretti et al. . |
| 5,458,420 | * 10/1995 | Otto ...................................... 384/448 |
| 5,547,290 | 8/1996 | Ouchi et al. . |
| 5,594,334 | * 1/1997 | Sonnerat et al. ................. 384/448 X |
| 5,622,437 | * 4/1997 | Alff ...................................... 384/448 |

FOREIGN PATENT DOCUMENTS

| 0 571 875 | 12/1993 | (EP) . |
|---|---|---|
| 2 669 598 | 5/1992 | (FR) . |

* cited by examiner

Primary Examiner—Richard M. Lorence
(74) Attorney, Agent, or Firm—Merchant & Gould P.C.

(57) ABSTRACT

For mounting a sensor (17) to a railway axle bearing unit having an annular sealing insert (10) fast with the stationary outer race of the bearing from the axially outer side thereof, a sensor mounting device comprises a mounting element of substantially annular shape (14, 14') adapted for mounting to an axial cylindrical surface (13) of the insert (10). The mounting element supports a sensor (17) to be positioned at the upper half of the annular insert (10) and a connector block (19), located at the lower half of the annular insert (10), and adapted for providing electrical connection between a wire (21) connected to the sensor (17) and a cable (22) connected to a further point remote from the bearing.

9 Claims, 4 Drawing Sheets

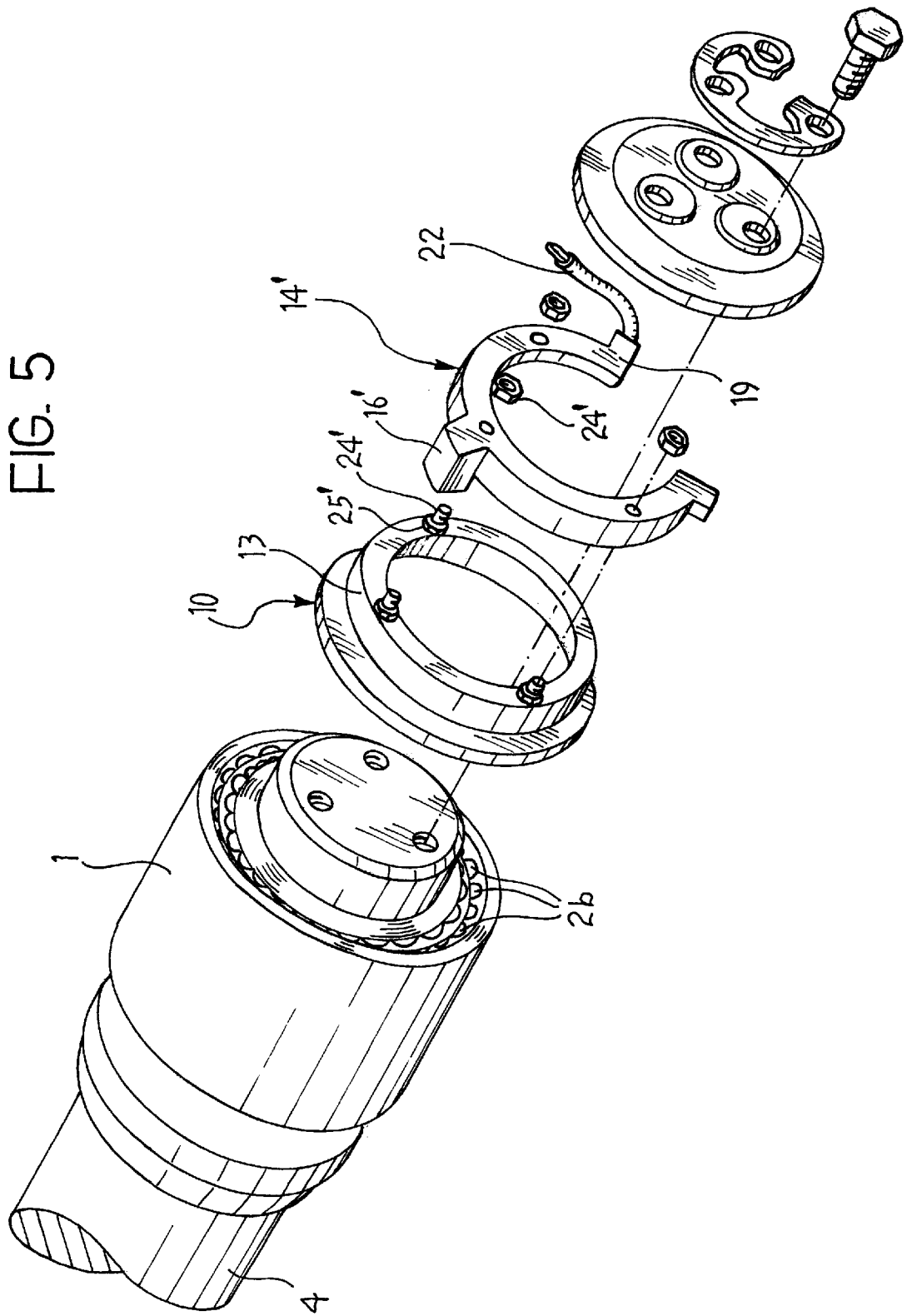

DEVICE FOR MOUNTING A SENSOR TO A RAILWAY AXLE BEARING UNIT

DESCRIPTION

The present invention refers to a device for mounting a sensor to a railway axle bearing unit of the type equipped with an annular sealing insert fast with the stationary outer race of the bearing on the axially outer side thereof. The present invention also relates to a railway axle bearing unit equipped with such a sensor mounting device.

As is well known, railway bogies rest on the stationary outer races of axle bearings by means of saddle-shaped elements that leave uncovered the lower half of the axially outer face of the axle, where a sealing device is usually fitted to close from the outside the annular gap between the inner and outer races of the axle bearing.

It is an object of the present invention to provide a device enabling to easily fit in the upper parts of said bearing units a sensor for monitoring the operational conditions of the bearing, particularly but not exclusively a temperature sensor.

The above and further objects are accomplished, in accordance with one aspect of the invention, by the provision of a device for mounting at least one sensor to a railway axle bearing unit having an annular sealing insert fast with the stationary outer race of the bearing from the axially outer side, characterised by comprising a mounting means of substantially annular shape adapted for mounting to an axial cylindrical surface of said insert, said mounting means being adapted for supporting:

a sensor to be positioned at the upper half of the annular insert;

electrical connecting means to be located at the lower half of the annular insert and adapted for providing electrical connection of first conductor means connected to the sensor, to second conductor means connected to a further point remote from the bearing.

According to another aspect of the invention, there is provided a bearing unit for a railway axle of the type equipped with an annular sealing insert integral with the stationary outer race of the bearing at the axially outer side thereof, characterised by comprising a sensor mounting device as defined herein above.

In order that the present invention may be well understood there will now be described a few preferred embodiments thereof, given by way of example, reference being made to the accompanying drawings, in which:

FIG. 5 is an exploded perspective view of a bearing unit fitted with an alternative embodiment of a device in accordance with the present invention.

Figure 1:
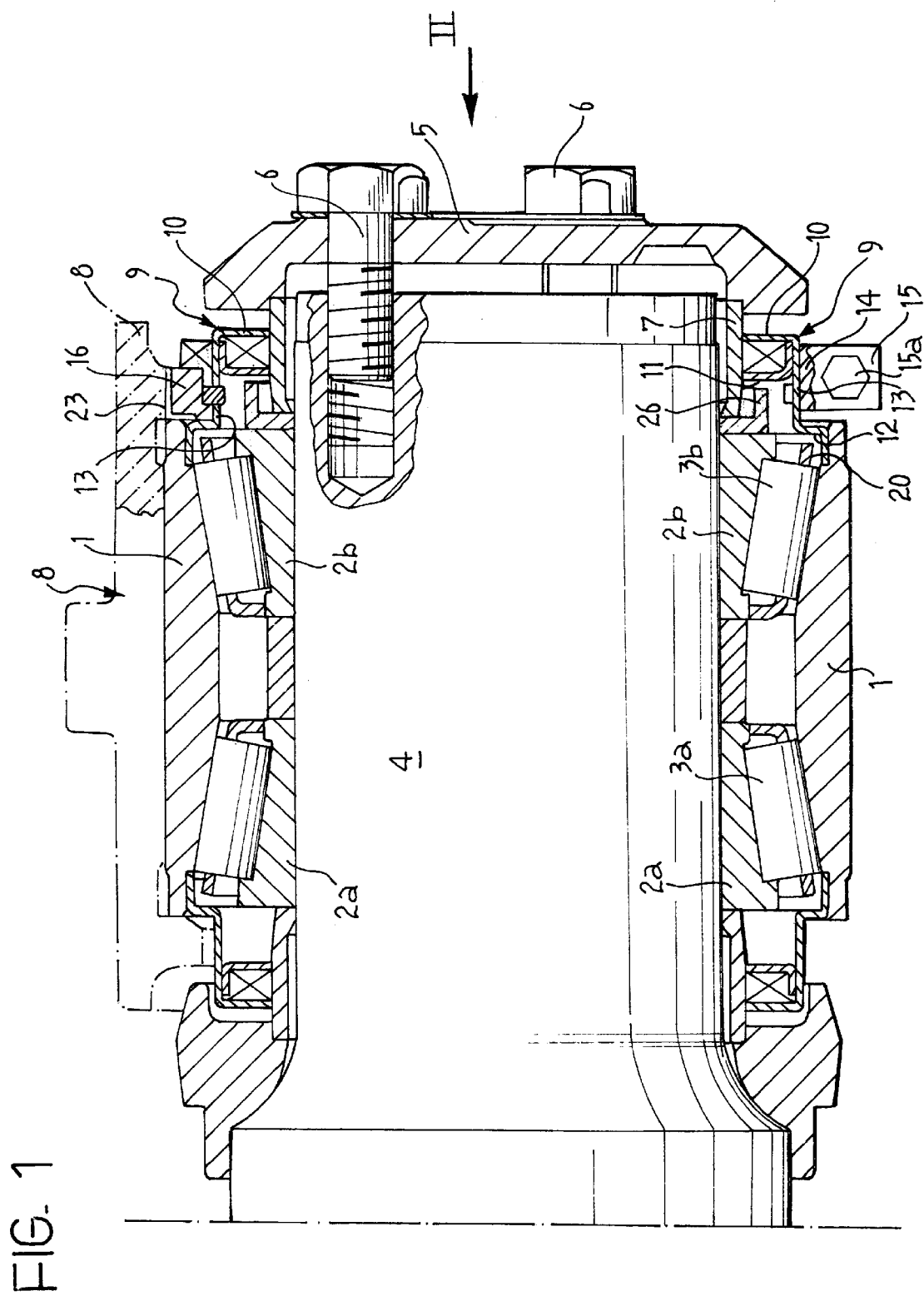
FIG. 1 is an axial cross-sectional view of a railway axle bearing unit equipped with a device according to the present invention.

With reference initially to FIG. 1, a railway axle bearing unit comprises a radially outer stationary race 1, a pair of radially inner rotating half-races 2a, 2b, and two sets of tapered rollers 3a, 3b, axially spaced and radially interposed between the outer race 1 and the inner half-races 2a, 2b, respectively. The inner half-races are fitted in known manner to the rotating axle 4. An end cap 5, fixed to the axle 4 by means of threaded fastening elements 6, retains the inner half-races 2a, 2b in their correct axial position through an interposed cylindrical spacer 7.

Resting superiorly on the outer race of the bearing is a concave, saddle-shaped or inverted U-shaped element 8 of a conventional railway bogie (not shown for simplicity). As visible in FIG. 2, saddle element 8 has a circumferential extent of about 180 degrees, congruent with the upper and radially outer semi-cylindrical surface of the outer race 1. The saddle element 8 holds the outer race 1 in its correct position due to the vertical load transmitted thereto.

Reference numeral 9 designates overall in FIG. 1 a sealing device of conventional design for sealing the annular gap 20 between the outer race 1 and the inner half-race 2b from the axially outer side of the bearing. The sealing device 9 is comprised of an annular sealing insert 10 integral with the stationary outer race 1 and an annular insert 11 fast for rotation with the axle 4 and the other rotating parts of the unit. The stationary annular insert 10, of metallic or other rigid material, is so shaped as to form a radial wall 12 adjacent to an axial cylindrical wall 13.

According to the present invention, the cylindrical wall 13 serves as a supporting surface for a device for mounting one or more sensors to be applied to the bearing unit. The mounting device comprises an annular strip 14 surrounding the cylindrical wall 13 from the outside. The strip 14 is circumferentially tightened by a tightening device indicated 15. In the preferred embodiment shown in the drawings, the strip 14 is a circular open ring the ends of which are coupled by a tightening means such as a bolt 15a. As will be apparent to those skilled in the art, tightening of the strip 14 may also be accomplished through different arrangements in a manner equivalent to that of the presently disclosed example.

Figure 3:
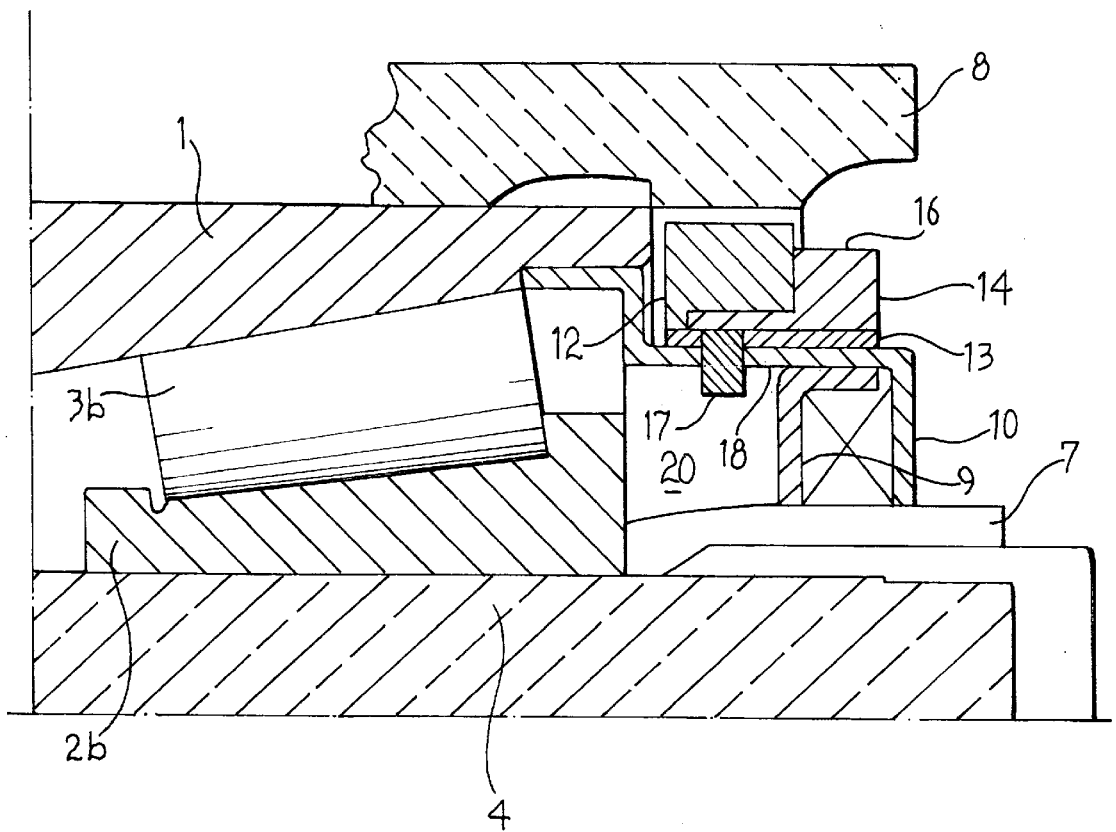
FIG. 3 is a view, to an enlarged scale, of a detail of FIG. 1.

At its upper portion, the strip 14 supports and is secured to a sensor body or sensor housing 16, preferably made of an electrically conductive material such as copper. Mounted to the sensor body 16 is a sensor 17, which in the preferred embodiment projects within the gap 20 through an opening 18 obtained in the cylindrical wall 13 (FIG. 3). This arrangement is ideal for positioning a temperature sensor 17. As known, most of the heat generated by the rolling friction develops in the higher part of the bearing, i.e. the part that is vertically loaded by the saddle element 8 of the railway bogie.

At a location on the lower semi-circumference of the strip 14, therefore in a zone left free by the saddle element 8 and therefore easily accessible, the strip bears a connector block 19. The connector block 19 electrically connects one or more wires 21 from the sensor 17 (and/or from other sensor(s) mounted on the same strip) with a cable 22 transmitting the signals generated by said sensor(s) to a processing unit (not shown) located in a remote position, for example on board of the bogie. According to a possible variant, the connector block 19 could also be adapted for connecting the cable 22 in detachable manner, for example by means of a connector (not shown).

The wire electrical connection 21 running along the arch of the strip 14, between the sensor body 16 and the connector block 19, can be improved by co-moulding the outer sheath of said wire to the strip. The sensor body 16 and the connector block 19 could as an alternative be fixed to the strip 14 in other ways, for example by welding.

In the preferred embodiment shown in the attached drawings, the sensor body 16 is radially outwardly protruding in a radial recess 23 formed e.g. by milling the top of the concave side of the saddle element 8. Such an arrangement is advantageous in that the sensor body 16 constitutes a stopping means impeding even slight relative rotation between the outer race 1 and the bogie. Such relative rotation could occur for example when the train passes over points and is therefore subjected to vertical jerks. Rotation of the outer race could in fact stress the cable 22 excessively or even rip or detach same, particularly where the connector block 19 includes a detachable connector.

Figure 2:
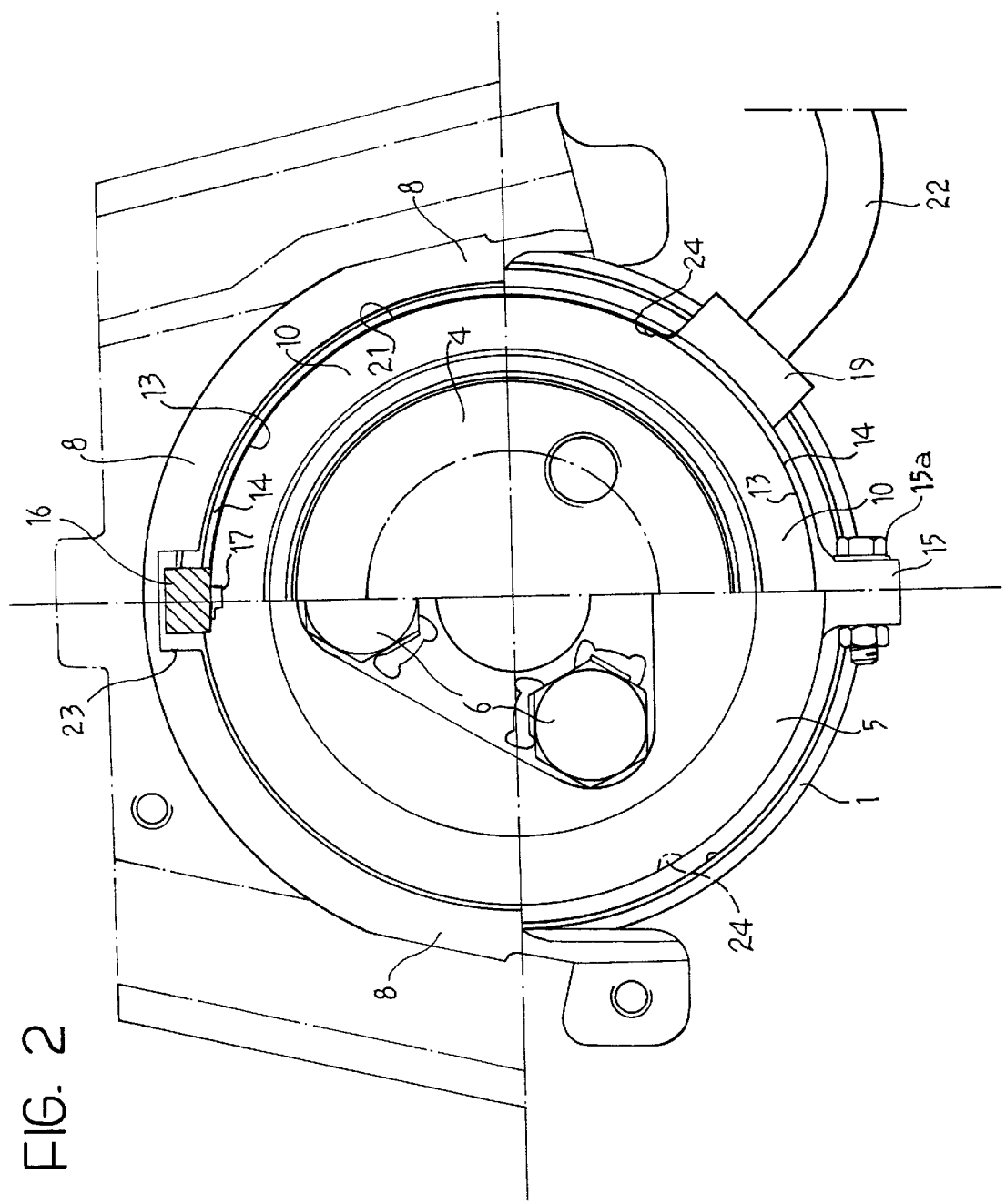
FIG. 2 is a partially sectioned side elevational view looking in the direction of arrow II of FIG. 1.
Figure 4:
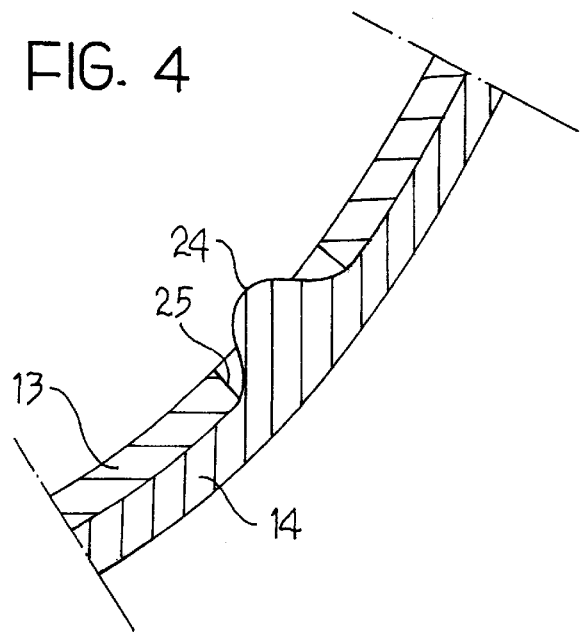
FIG. 4 is a view, to an enlarged scale, of a detail of FIG. 2.

In order to securely retain the strip 14 onto the outer surface of the cylindrical wall 13, particularly to axially lock the strip to said wall, there are preferably provided engaging means and corresponding seats, for example in form of protuberances 24 formed with the strip 14 and apertures or recesses 25 formed in the cylindrical wall 13 (FIG. 4). In a particularly advantageous embodiment, as shown in FIG. 2, said axially retaining means and seats are disposed symmetrically with respect to the vertical axial plane P, such that the mounting device can be indifferently mounted with the cable 22 to the right as shown, or to the left, according to requirements. In case retaining seats are provided in form of radial apertures, the strip 14 is suitably equipped with rubber or elastomeric gaskets (not shown) at said apertures.

Referring to FIG. 5, there is illustrated, an alternative embodiment of the present invention wherein the mounting means supporting the sensor 17, the connector block 19 and the conductor wire 21 between these two devices is an element in form of a ring 14' open at its lower part. At its upper portion, the open ring 14' integrally forms a sensor housing portion 16' and an inner or rear channel (not shown for simplicity) at its right branch portion for housing the conductor wire(s) 21 therein. The open ring 14' is fixed to the annular insert 10 by means of fastening elements 24' engaging fastening holes 25' formed in the insert 10 at locations symmetrical with respect to the vertical plane P, as discussed herein above with reference to the embodiment of FIGS. 1 and 2.

The mounting device of the present invention is adapted for supporting any kind of temperature sensor (electronic, thermocouple, platinum, magneto-resistance, etc.) and also other types of sensors. For example, in replacement of or in addition to a temperature sensor fitted in the higher part of the bearing unit, there can be provided a sensor for gauging the revolving speed or the angular displacement of the inner half-races of the bearing unit. In FIG. 2 there is schematically shown an example wherein the sensor 17 is a sensor for gauging revolving speed, facing an impulse ring 26 fast for rotation with the axle 4 and equipped with circumferentially spaced magnetised sectors or metal teeth.

As will be apparent to those skilled in the art, the present invention allows to indifferently mount sensors of any kind, such as speed, position or displacement sensors, vibration sensors, or sensors for detecting the occurrence of emergency conditions such as derailment or axle locking. Data transmitted to the processing unit on board of the railway bogie may also be utilised for gathering information on the condition of the lubricant grease contained in the bearing unit. It will be appreciated that the device of this invention is easy to mount and accessible from the outside, which renders it ideal for the application of sensors to axles fitted with bushings providing electrical connection to earth.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing examples. The scope of the invention is to be limited only by the appended claims.

What is claimed is:

1. A railway axle bearing unit, comprising:
    a stationary outer race (1) having an axial outer side;
    a rigid annular sealing insert (10) integrated with the stationary outer race (1) at the axial outer side, the annular sealing insert (10) including an upper portion and a lower portion and having an axial cylindrical surface (13);
    a mounting means (14, 14') of substantially annular shape adapted for mounting onto the axial cylindrical surface (13) of the annular sealing insert (10);
    a sensor (17) supported by the mounting means (14, 14') and positioned at the upper portion of the annular sealing insert (10); and
    an electrical connecting means (19) supported by the mounting means (14, 14') and located at the lower portion of the annular sealing insert (10), the electrical connecting means (19) being adapted for providing electrical connection for a first conductor means (21) that is connected to the sensor (17) with a second conductor means (22) that is connected to a unit in a remote position.

2. A bearing unit as claimed in claim 1, wherein said sensor is supported by said mounting means in a position adapted to locate the sensor substantially at the top of the annular sealing insert.

3. A bearing unit as claimed in claim 1, wherein said sensor is chosen from the group consisting of: temperature sensors, sensors for gauging rotational speed or angular position of the axle, vibration sensors, sensors for detecting derailment conditions, and sensors for detecting a locked condition of the axle.

4. A bearing unit as claimed in claim 1, wherein said mounting means is adapted for supporting also said first conductor means.

5. A bearing unit as claimed in claim 1, wherein said mounting means and said insert are equipped with reciprocal engaging means for axially retaining said mounting means on said insert.

6. A bearing unit as claimed in claim 5, wherein said sensor and said engaging means are located along said mounting means so as to be mounted to said bearing unit symmetrically with respect to a vertical axial plane of the axle.

7. A bearing unit as claimed in claim 1, wherein said mounting means comprises an annular strip adapted for being tightened onto said axial cylindrical surface of said annular insert.

8. A bearing unit as claimed in claim 1, wherein said mounting means comprises a ring-shaped element open at its lower part.

9. An axle bearing unit in connection with a railway bogie, the bearing unit comprising:
    a stationary outer race (1) having an outer surface;
    a rigid annular sealing insert (10) integrated with the stationary outer race (1), the annular sealing insert (10) having an axial cylndrical surface (13);
    a mounting means (14, 14') of substantially annular shape adapted for mounting to the axial cylindrical surface (13) of the annular sealing insert (10);
    a sensor body (16) mounted to the mounting means (14, 14'); and
    a sensor (17) mounted to the sensor body (16);
    wherein the railway bogie has a saddle-shaped or inverted U-shaped element (8) resting on the outer surface of the stationary outer race (1) of the bearing unit, the saddle-shaped element (8) having a radial recess (23) formed therein;
    wherein the sensor body (16) is protruded into the radial recess (23).

* * * * *